United States Patent Office 3,534,025
Patented Oct. 13, 1970

3,534,025
22,25-EPOXY STEROIDS AND PROCESSES FOR THEIR PREPARATION
Albert Jager and Ulrich Kerb, Berlin, Germany, assignors to Hoffmann-La Roche Inc., Nutley, N.J., a corporation of New Jersey
No Drawing. Filed Dec. 11, 1968, Ser. No. 783,104
Claims priority, application Germany, Dec. 30, 1967, 1,643,056
Int. Cl. C07c *173/00*
U.S. Cl. 260—239.55                20 Claims

ABSTRACT OF THE DISCLOSURE 22,25-epoxy steroids and methods for their preparation are described. These compounds are useful as metamorphosis hormones and accordingly the comopunds may be employed in the control of insect population. Additionally, they are useful as intermediates for the preparation of pharmacologically active steroidal compounds.

---

This invention relates generally to compounds having the following partial formula

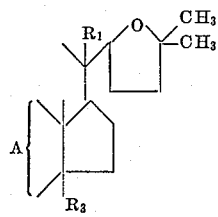

and more particularly to compounds of the following general formula

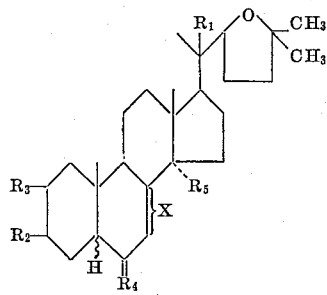

where A represents the remainder of the steroidal nucleus, $R_1$, $R_2$ and $R_3$ each independently are hydrogen, hydroxy or acyloxy;

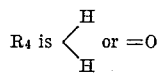

$R_5$ is H or hydroxy; X represents a single or double bond between the 7 and 8 position carbon atoms; $R_2$, $R_3$ and the hydrogen atom at the 5-position can have the $\alpha$ or $\beta$ orientation; and the 21-position methyl group and the C—O bond at the 22-position can have the $\alpha_F$ or $\beta_F$ configuration.

The acyloxy groups represented by $R_{1-3}$ are primarily the residues of acids normally used in steroid chemistry for esterifying free hydroxyl groups. Especially suitable are lower acyloxy groups. By the term "lower acyloxy" is meant a radical derived from an aliphatic carboxylic acid having up to about 12 carbons by removal of the carboxyl group. Employing such groups for the esterification of free hydroxyl groups is well known in steroid chemistry. The aforesaid acids may be saturated or unsaturated, straight, or branched chain, and may contain one or more substituents, such as halo, including chloro and fluoro, nitro, oxy, and the like. Suitable acids include formic acid, acetic acid, propionic acid, trimethyl acetic acid, caprioic acid, enanthic acid, hendecanoic acid, phenyl acetic acid, benzoic acid, cyclopentyl propionic acid, trifluoroacetic acid, amino acetic acid, oxypropionic acid, adipic acid, succinic acid, undecyloic acid, and the like.

In addition to the compounds of the present invention described above, i.e., compounds of Formula I and Formula II above, the present invention relates, in a process embodiment, to the conversion of corresponding starting material of the following partial formula

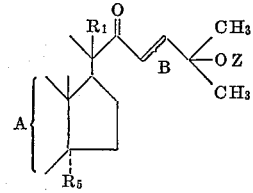

where A, $R_1$ and $R_5$ are as above; Z is hydrogen, nitro or tetrahydropyranoyl; B is a single or triple carbon-carbon bond between carbon atoms at positions 23 and 24; and when B is a single carbon-carbon bond, the 22 keto group may also be in the enol form by treating such compounds with hydrogen in the presence of a metal catalyst in a neutral or acid solution. If desired, free hydroxy groups in the named product may be esterified or existing acyloxy groups may be saponified.

Preferred starting materials for use in the practice of the process of the present invention are compounds corresponding to formula

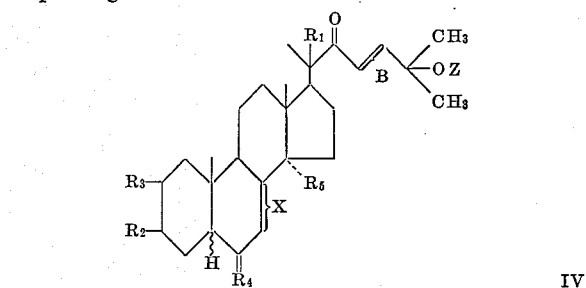

where $R_1$, $R_2$, $R_3$, $R_4$, $R_5$, Z, B and X are as above both as to meaning and configuration and the 22-keto group can be in the enol form (in which instance it is preferably acylated).

The general reaction conditions employed in the process of the present invention correspond to those procedures customarily used by one skilled in the art for hydrogenation procedures.

The metal catalyst useful in the practice of the present invention is preferably a noble metal catalyst, which in a most prefered embodiment is platinum or a platinum compound. The metal catalyst, if desired, may be deposited on known support materials.

The pyran ring closing in the 22,25-position under the conditions used in the inventive process must be considered unexpected. Similarly it was unexpected to observe the selectivity exhibited by the instant reaction since it is very well known that the C=C—C=O grouping is only slightly labile to hydrogenation conditions.

In the embodiment of the present invention wherein a starting material having Z as either hydrogen or tetrahydropyranyl the resulting product obtained, with reference to the configuration in the 22-position, will be formed as a mixture of diasteromers. In the embodiment wherein the starting material has a $NO_2$ group as Z, the reaction proceeds with stereo specivity and the resulting product with reference to the 22-position C—O group has the $\beta_F$ configuration.

The process of the present invention may be conducted in acidic as well as in neutral solvents. The choice of a specific solvent is however dependent on whether in the starting material the 22-position keto group is as is or whether it exists in enol form. If the starting material contains the 22-keto group in its enol form, then acid and neutral solvents are both useful. For example, the following are especially preferred, lower alkanols, such as methanol, ethanol, propanol, or acids, such as acetic acid or solvents, such as dioxane, acetone, ether, tetrahydrofuran, ethyl acetate, etc. Additionally, mixtures of neutral and acid solvents may be employed. When the starting material contains a 22-keto group per se, the conversion is carried out in an acid solvent, preferably in acetic acid, or in a neutral solvent to which has been added an acid, such as for example, acetic acid, paratoluene sulfonic acid, sulfuric acid, perchloric acid and the like.

The products of the present invention corresponding to compounds having Formula I or Formula II above not only are useful as intermediates in the preparation of other steroidal compounds of known activity but also possess activity as insect metamorphosis hormones. Thus, the products of this invention may be employed to induce insect metamorphosis at a point in time which is detrimental to the further population population of the insect. Because of the hormonal nature of these products, a resistance to the reaction cannot develop, thus avoiding a significant disadvantage of conventional insecticides. In addition to their metamorphosis-inducing activity, the products of this invention possess a profound influence on the cell metabolism in other animals, especially in warm-blooded animals or crustaceans. For example, by the use of products of this invention, it is possible to induce the molting stage in crustaceans, thus rendering them suitable as fish bait. Additionally, the products of this invention can be employed to control crustacean infestation and the damage caused thereby by inducing the molting stage and exposing the crustacean to natural decimation. It is thus readily apparent that the products of this invention have wide utility as pharmaceuticals in hormone and veterinary medicine as well as use as agents for the control of insects in agricultural applications. Furthermore, as previously indicated, many of the products of this invention serve as intermediates for the manufacture of still other valuable medicinal or agricultural agents.

The products of this invention can be employed in the form of preparations which contain them in admixture with suitable organic or inorganic inert carrier materials, such as, for example, water, starch, magnesium stearate, talc, vegetable oils, polyalkylene glycol, or the like.

The following examples illustrate some aspects of the present invention but are not intended to limit the scope thereof in any manner.

Example 1

A solution of 86.25 mg. of 20-(1'-oxo-4'-hydroxy-4'-methylpent-1'-yl)-5-pregnen-3β,20-diol in 10 ml. of acetic acid was mixed with 25 mg. PtO$_2$ and hydrogenated until the uptake of hydrogen ceased. The catalyst was filtered off, the filtrate diluted with methylene chloride, washed until neutral with water and evaporated in vacuo. One thus obtains 20-(2',2'-dimethyl-oxolan-5'-yl)-5α-pregnan-3β,20-diol melting after recrystallization from acetone-hexane at 161–162° C.

The starting material may be prepared as follows:

To a ethyl magnesium bromide solution (prepared from 6.44 g. magnesium 22.2 ml. ethyl bromide in 130 ml. ether) was added 16.5 ml. 2-methyl-4-pentyn-2-ol in 350 ml. tetrahydrofuran and the ether distilled off. This Grignard solution was cooled to 20° C., a solution of 4.175 g. pregnenolone in 130 ml. tetrahydrofuran was added dropwise and the reaction mixture stirred for one hour at room temperature. The reaction mixture was then decomposed with ammonium chloride solution, extracted with ethyl acetate and the ethyl acetate solution washed with water and evaporated in vacuo. One thus obtains 20-(4'-hydroxy-4'-methylpent-1'-yn-1'-yl)-5-pregnen-3β,20-diol melting after recrystallization from ethyl acetate at 205–206.5° C.

A total of 2 g. of 20-(4'-hydroxy-4'-methyl-pent-1'-yn-1'-yl)-5-pregnen-3β,20-diol into 200 ml. of absolute methanol was stirred five minutes at room temperature with 2 g. mercuric acetate and 1 ml. boron trifluoride etherate. An additional 1 ml. of pyridine was added and then the solution was stirred again with ice water, treated with sodium chloride and extracted with ethyl acetate. The ethyl acetate solution was washed with 1 N-hydrochloric acid and sodium chloride solution and evaporated. In this manner one obtains 20-(1'-oxo-4'-hydroxy-4'-methyl-pent-1'-yl)-5-pregnen-3β,20-diol melting after recrystallization from ethyl acetate at 184–195° C.

Example 2

A total of 1.15 g. 14-hydroxy-25-(tetrahydropyranyloxy)-2β,3β-diacetoxy-5α-cholest-7-en-23-yn-6,22-dione in 20 ml. of 95 percent acetic acid was hydrogenated in admixture 0.3 g. PtO$_2$ and the reaction mixture was worked up as described in Example 1. The resulting 22-diastereomers were separated by utilizing preparative thin-layer chromatography using a 1:1 ether-methylene chloride system. After recrystallization from acetone-hexane there was obtained (22R):14-hydroxy-2β,3β-diacetoxy-22,25-epoxy-5α-cholest-7-en-6-one melting at 252–255° C. and (22S): 14-hydroxy-2β,3β-diacetoxy-22,25-epoxy-5α-cholest-7-en-6-one melting at 245–248° C.

The starting material may be prepared as follows:

A solution containing 2 g. of (22R)-22-hydroxy-25-(tetrahydroxypyranyloxy-2β,3β-diacetoxy-5α-cholest-7-en-23-yn-6-one and 0.7 g. selenium dioxide in 40 ml. dioxane was stirred for fifteen minutes at 70° C. The resulting solution was filtered over Kieselgel, the filtrate diluted with methylene chloride, washed with water, evaporated and the residue recrystallized from isopropylether-methylene chloride. The product obtained was (22R)-14,22-dihydroxy-25-(tetrahydropyranyloxy)-2β,3β-diacetoxy - 5α-cholest-7-en-23-yn-6-one melting at 213–214° C.

A total of 1.4 g. (22R)-14,22-dihydroxy-25-(tetrahydropyranyloxy)-2β,3β-diacetoxy-5α-cholest-7-en - 23 - yn-6-one in 25 ml. of tetrahydrofuran was mixed with 16 g. of activated manganese dioxide and stirred for thirty hours at room temperature. The manganese dioxide was filtered off, the filtrate concentrated and recrystallized from isopropyl ether. The obtained product was 14-hydroxy-25-(tetrahydropyranyloxy) - 2β,3β-diacetoxy-5α-cholest-7-en-23-yn-6,22-dione melting at 177–179° C.

Example 3

A total of 50 mg. (22R):14-hydroxy-2β,3β-diacetoxy-22,25-epoxy-5α-cholest-7-en-6-one was stirred at room temperature for one and a half hours in 4 ml. of 1 percent methanolic potassium hydroxide solution and then heated to boiling for seven minutes. After neutralization with acetic acid then employing preparative thin-layer chromatography and recrystallization from acetone-hexane, the product (22R)2β,3β,14 - trihydroxy-22,25-epoxy-5β-cholest-7-en-6-one was obtained melting at 209–210.5° C.

Example 4

A total of 50 mg. (22S):14-hydroxy-2β,3β-diacetoxy-22,25-epoxy-5α-cholest-7-en-6-one was saponified and isolated in the manner described in Example 3. The product (22S):2β,3β,14-trihydroxy-22,25-epoxy-5β-cholest-7-en-6-one melted at 211.5–213° C.

Example 5

A total of 290 mg. 14-hydroxy-25-(tetrahydropyranyloxy)-2β,3β-diacetoxy-5α-cholest-7-en-23-yn-6,22 - dione in 13 ml. methanol was mixed with 150 mg. PtO₂ and hydrogenated. The catalyst was filtered off, the filtrate stirred for thirty minutes at room temperature with 0.5 ml. 2 N hydrochloric acid, diluted with ethyl acetate and washed with water and evaporated. The product 14,25-dihydroxy-2β,3β-diacetoxy-5α-cholest-7-en-6,22-dione melted, after recrystallization from acetone-isopropyl ether, at 163.5–167° C.

A total of 150 mg. of the above-indicated product was hydrogenated and worked up as described in Example 2. The resulting 22,25-epoxide was identical with the material prepared in Example 2.

Example 6

A total of 25 mg. of 14-hydroxy-25-nitryloxy-2β,3β-diacetoxy-5α-cholest-7-en-23-yn-6,22-dione in 4 ml. of 95 percent acetic acid was hydrogenated over 10 mg. PtO₂. The catalyst was filtered off, the filtrate mixed with carbon tetrachloride, evaporated and the residue recrystallized from methylene chloride-isopropyl ether. The resulting product (22R):14-hydroxy-2β,3β-diacetoxy-22,25-epoxy-5α-cholest-7-en-6-one was identical with that obtained in Example 2 above.

The starting material may be prepared as follows:

A total of 1 g. (22R)22-hydroxy - 25 - (tetrahydropyranyloxy)-2β,3β-diacetoxy-5α-cholest-7-en-23-yn-6-one in 20 ml. tetrahydrofuran was stirred for 44 hours at room temperature with 10 g. of manganese dioxide. The manganese dioxide was filtered off, the filtrate concentrated and recrystallized from isopropyl ether. The product so-obtained was 25-(tetrahydropyranyloxy)-2β,3β-diacetoxy-5α-cholest - 7 - en - 23 - yn - 6,22 - dione melting at 143–144.5° C.

A total of 150 mg. of the above-obtained compound was stirred in 4.5 ml. tetrahydrofuran containing 0.9 ml. of 2 N-hydrochloric acid at 20° C. for forty minutes. The solution was diluted with ethyl acetate, washed with water, evaporated and the residue recrystallized from isopropyl ether-methylene chloride. The product obtained was 25 - hydroxy - 2β,3β-diacetoxy-5α-cholest-7-en-23-yn-6,22-dione melting at 204–205° C.

A total of 60 mg. of 25-hydroxy-2β,3β-diacetoxy-5α-cholest-7-en-23-yn-6,22-dione in 1.5 ml. of chloroform was stirred for six minutes at −10° C. with 0.09 ml. of acetic anhydride and 0.045 ml. of nitric acid (d=1.51). The solution was diluted with chloroform, washed with water, evaporated and the residue recrystallized from isopropyl ether-methylene chloride. The product obtained was 25 - nitryloxy-2β,3β-diacetoxy-5α-cholest-7-en-23-yn-6,22-dione melting at about 161° C.

A total of 45 mg. of the above material in 1.2 ml. of dioxane was stirred at 70° C. for fifteen minutes with 20 mg. of selenium dioxide. The product 14-hydroxy-25-nitryloxy-2β,3β-diacetoxy-5α-cholest-7 - en - 23 - yn - 6,22-dione was separated from selenium utilizing preparative thin-layer chromatography.

Example 7

A total of 47.5 mg. of 20-(4′-hydroxy-1′-acetoxy-4′-methyl-1′-penten-1′-yl)-5-pregnen-3β,20-diol was dissolved in 5 ml. of methanol and 5 ml. of tetrahydrofuran and then together with 25 mg. of PtO₂ was hydrogenated until the uptake of hydrogen ceased. The catalyst was filtered off, the filtrate evaporated in vacuum and the residue recrystallized from acetone-hexane. The product obtained, 20-(2′,2′-dimethyl-oxolan-5′-yl) - 5α - pregnan-3β,20-diol was identical to that obtained utilizing the procedure of Example 1.

The starting material was prepared by treating 300 mg. of 20-(4′-hydroxy-4′-methyl-pent-1′-yn-1′-yl)-5-pregnen-3β,20-diol in 7.5 ml. of glacial acetic acid with 300 mg. of mercuric acetate with stirring for five hours at room temperature and working up the reaction mixture as described in Example 1. The product obtained, 20-(4′-hydroxy-1′-acetoxy-4′-methyl-1′-penten-1′-yl) - 5 - pregnen-3β,20-diol melted after recrystallization from acetone at 221–223° C.

We claim:

1. Compounds of the formula

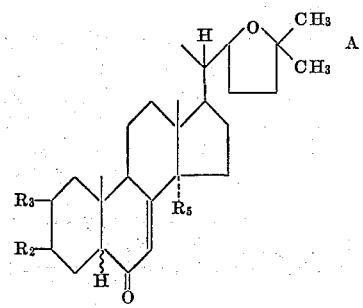

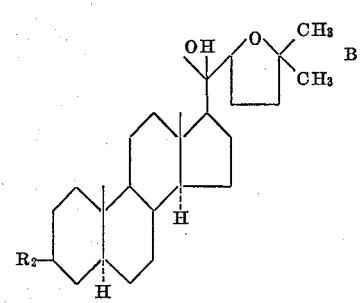

where R₂ and R₃ are hydroxy or acyloxy; R₅ is hydrogen or hydroxy; the hydrogen atom at the 5-position can have the α or β-orientation in Formula II(A); the hydroxy group at the 20 position can be acylated and the 21-position methyl group and the C–O bond at the 22-position can have the $\alpha_F$ or $\beta_F$ configuration.

2. Compounds of claim 1 wherein in Formula II(A) R₂ and R₃ are acyloxy; and R₅ is hydroxy.

3. The compound of claim 2 which is (22R):14-hydroxy - 2β,3β - diacetoxy - 22,25 - epoxy-5α-cholest-7-en-6-one.

4. The compound of claim 2 which is (22S):14-hydroxy - 2β,3β - diacetoxy - 22,25 - epoxy-5α-cholest-7-en-6-one.

5. Compounds of claim 1 wherein in Formula II(A) R₂, R₃ and R₅ are hydroxy.

6. The compound of claim 5 which is (22R):2β,3β,14-trihydroxy-22,25-epoxy-5β-cholest-7-en-6-one.

7. The compound of claim 5 which is (22S):2β,3β,14-trihydroxy-22,25-epoxy-5β-cholest-7-en-6-one.

8. The compound of claim 1 which is 20-(2′,2-dimethyloxolan-5′-yl)-5-α-pregnan-3β,20-diol.

9. Compounds of the formula

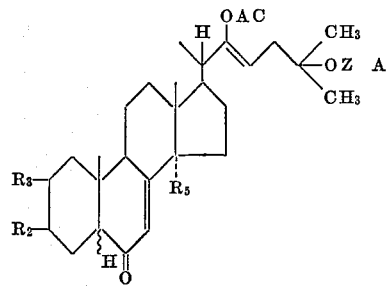

7

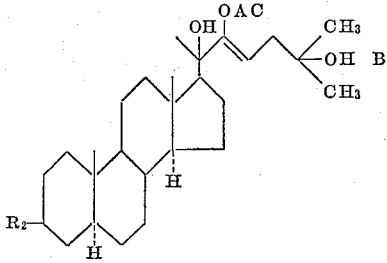

where $R_2$ and $R_3$ each independently are hydrogen, hydroxy or acyloxy; $R_5$ is hydrogen or hydroxy; Z is hydrogen, nitro or tetrahydropyranyl; Ac is acyl; the hydrogen at position 5 of Formula IV(A) can have the $\alpha$ or $\beta$ orientation; and the 21-position methyl group and the C–O bond at the 22-position can have the $\alpha_F$ or $\beta_F$ configuration.

10. 20 - (4' - hydroxy - 1' - acetoxy - 4' - mtehyl -1' - penten-1'-yl)-5-pregnen-3$\beta$,20-diol.

11. 20 - (4' - hydroxy - 4' - methyl - pent - 1' - yn - 1' - yl)-5-pregnen-3$\beta$,20-diol.

12. 20 - (1' - oxo - 4' - hydroxy - 4' - methyl - pent - 1'-yl)-5-pregnen-3$\beta$,20-diol.

13. 14 - hydroxy - 25 - (tetrahydropyranyloxy)-2$\beta$,3$\beta$-diacetoxy-5$\alpha$-cholest-7-en-23-yn-6,22-dione.

14. 25 - tetrahydropyranyloxy) - 2$\beta$,3$\beta$ - diacetoxy - 5$\alpha$ - cholest-7-en-23-yn-6,22-dione.

15. 25 hydroxy - 2$\beta$,3$\beta$-diacetoxy - 5$\alpha$ - cholest - 7 - en - 23-yn-6,22-dione.

16. 25 - nitryloxy - 2$\beta$,3$\beta$ -diacetoxy - 5$\alpha$ - cholest - 7 - en-23-yn-6,22-dione.

17. 14 - hydroxy - 25 - nitryloxy - 2$\beta$,3$\beta$ - diacetoxy - 5$\alpha$-cholest-7-en-23-yn-6,22-dione.

18. A process for the preparation of compounds of the formula

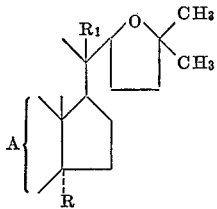

which comprises hydrogenating in the presence of a metal catalyst and in an acidic or neutral solution a compound of the formula

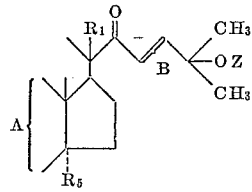

where A, $R_1$ and $R_5$ are as above; Z is hydrogen, nitro or tetrahydropyranyl; B is a single or triple carbon-carbon bond between carbon atoms at positions 23 and 24; and when B is a single carbon-bond, the 22 keto can be in the enol form which enol form can be acylated.

19. The process of claim 18 wherein the hydrogenation product is saponified to remove any acyl groups.

20. The process of claim 18 wherein the hydrogenation product is acylated to esterify free hydroxy groups.

References Cited

UNITED STATES PATENTS 3,378,549   4/1968   Edwards et al. _____ 260—239.55
3,481,926   12/1969  Huppi et al. _____ 260—239.55

OTHER REFERENCES

Harrison et al.: Tetrahedron Letters, 1967, No. 29, pp. 3457–3460.

Furlenmeier et al.: Experientia, Sept. 15, 1966, p. 573.

Kerb et al.: Tetrahedron Letters, No. 40, 1968, pp. 4277–4280.

Takemoto et al.: Tetrahedron Letters, No. 47, 1968, pp. 4929–4932.

LEWIS GOTTS, Primary Examiner

E. C. LOVE, Assistant Examiner

U.S. Cl. X.R.

260—397.2, 999

PO-1050
(5/69)

UNITED STATES PATENT OFFICE
CERTIFICATE OF CORRECTION

Patent No. 3,534,025         Dated   October 13, 1970

Inventor(s)   Jager and Kerb

It is certified that error appears in the above-identified patent and that said Letters Patent are hereby corrected as shown below:

Column 7, line 13 in Claim 9  "$R_2$ and $R_3$ independently are hydrogen, hydroxy"  should be $\underline{R_2 \text{ and } R_3 \text{ are hydroxy}}$ Column 7, line 20 in Claim 10  "4'mtehyl"  should be $\underline{4' \text{ methyl}}$ Column 7, lines 36-45 of Claim 18

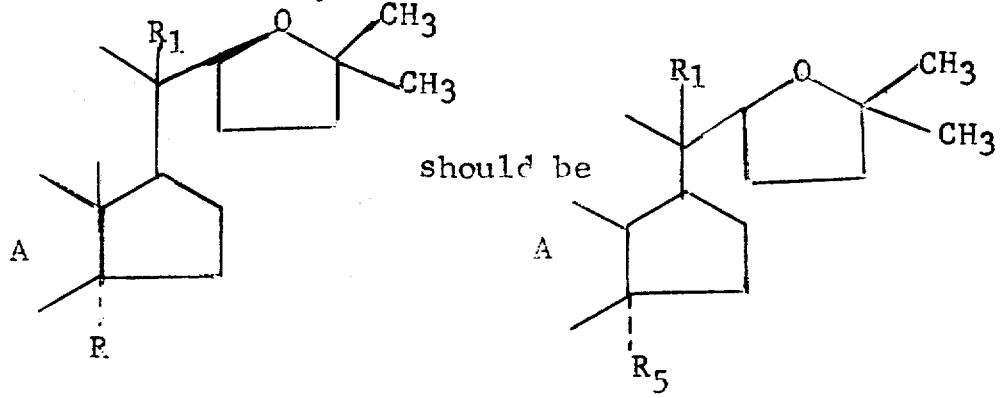

UNITED STATES PATENT OFFICE
CERTIFICATE OF CORRECTION

PO-1050
(5/69)

Patent No. 3,534,025      Dated October 13, 1970

Inventor(s) Jager and Kerb

It is certified that error appears in the above-identified patent and that said Letters Patent are hereby corrected as shown below:

Column 8, line 20 in Claim 18 "B is a single carbon bond" should be

B is a single carbon-carbon bond

SIGNED AND SEALED
JAN 5 1971

(SEAL)
Attest:

Edward M. Fletcher, Jr.
Attesting Officer

WILLIAM E. SCHUYLER, JR.
Commissioner of Patents